US012640289B2

(12) United States Patent
Ando

(10) Patent No.: US 12,640,289 B2
(45) Date of Patent: May 26, 2026

(54) GROMMET WITH COUPLING PORTIONS

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 181 days.

(21) Appl. No.: 18/564,007

(22) PCT Filed: May 23, 2022

(86) PCT No.: PCT/JP2022/021041
§ 371 (c)(1),
(2) Date: Nov. 24, 2023

(87) PCT Pub. No.: WO2022/255134
PCT Pub. Date: Dec. 8, 2022

(65) Prior Publication Data
US 2024/0274329 A1 Aug. 15, 2024

(30) Foreign Application Priority Data
Jun. 4, 2021 (JP) ................................. 2021-094665

(51) Int. Cl.
*H01B 17/58* (2006.01)
*B60R 16/02* (2006.01)

(52) U.S. Cl.
CPC ....... *H01B 17/583* (2013.01); *B60R 16/0222* (2013.01)

(58) Field of Classification Search
None
See application file for complete search history.

(56) References Cited

U.S. PATENT DOCUMENTS

| | | | |
|---|---|---|---|
| 6,225,562 B1* | 5/2001 | Fujishita ............. | B60R 16/0222 174/152 G |
| 7,641,271 B1* | 1/2010 | Haydin ............... | B60R 16/0222 296/1.07 |

(Continued)

FOREIGN PATENT DOCUMENTS

| | | |
|---|---|---|
| JP | S59-103516 U1 | 7/1984 |
| JP | 2017-010638 A | 1/2017 |
| JP | 2017-131056 A | 7/2017 |

OTHER PUBLICATIONS

International Search Report issued on Jul. 26, 2022 for WO 2022/255134 A1 (4 pages).

*Primary Examiner* — Timothy J. Dole
*Assistant Examiner* — Muhammed Azam
(74) *Attorney, Agent, or Firm* — Venjuris, P.C.

(57) ABSTRACT

A grommet includes: a first coupling portion that couples a first tubular portion and a first base portion to each other; and a second coupling portion that couples a second tubular portion and a second base portion to each other. The first coupling portion and the second coupling portion are provided with a space therebetween in the axial direction of the grommet. The first coupling portion includes a first flexible portion. The second coupling portion includes a second flexible portion. The first flexible portion and the second flexible portion are configured to bend so as to absorb an inclination of a wire harness with respect to a vehicle body panel. The first coupling portion and the second coupling portion provide a first sound insulation space therebetween.

9 Claims, 5 Drawing Sheets

(56)     References Cited

U.S. PATENT DOCUMENTS

| | | | | |
|---|---|---|---|---|
| 8,299,364 | B2 * | 10/2012 | Suzuki | B60R 16/0222 |
| | | | | 174/152 G |
| 9,711,958 | B2 * | 7/2017 | Nielsen | H02G 3/22 |
| 10,183,636 | B2 * | 1/2019 | Kaefer | H01R 13/6592 |
| 10,227,052 | B2 * | 3/2019 | Nakagawa | F16L 11/11 |
| 10,787,134 | B2 * | 9/2020 | Suenaga | H01B 17/58 |
| 11,186,240 | B2 * | 11/2021 | Ando | B60R 16/0222 |
| 11,242,017 | B2 * | 2/2022 | Ando | B60R 16/0222 |
| 11,508,499 | B2 * | 11/2022 | Kiyota | H01B 17/583 |
| 11,581,683 | B2 * | 2/2023 | Ohtaka | H01R 13/641 |
| 11,651,876 | B2 * | 5/2023 | Kiyota | H01B 17/586 |
| | | | | 174/72 A |
| 11,780,388 | B2 * | 10/2023 | Ando | H02G 3/22 |
| | | | | 174/152 G |
| 2021/0129775 | A1 * | 5/2021 | Ando | B60R 16/0222 |
| 2023/0115622 | A1 * | 4/2023 | Ji | B60R 16/0222 |
| | | | | 174/153 G |
| 2024/0274329 | A1 * | 8/2024 | Ando | H01B 17/58 |
| 2024/0425001 | A1 * | 12/2024 | Ando | B60R 16/0222 |
| 2025/0087390 | A1 * | 3/2025 | Ando | B60R 16/02 |

* cited by examiner

GROMMET WITH COUPLING PORTIONS

CROSS REFERENCE TO RELATED APPLICATIONS

This application is a national phase of PCT application No. PCT/JP2022/021041, filed on 23 May 2022, which claims priority from Japanese patent application No. 2021-094665, filed on 4 Jun. 2021, all of which are incorporated herein by reference.

TECHNICAL FIELD

The present disclosure relates to a grommet.

BACKGROUND

Conventionally, as disclosed in Patent Document 1, for example, there is a grommet that is attached to an attachment hole that passes through a vehicle body panel that separates the interior and the exterior of the vehicle and protects a wire harness that is inserted into the attachment hole. Such a grommet is made of an elastic material such as rubber, and is configured to be able to waterproof the gap between the attachment hole of the vehicle body panel and the wire harness.

PRIOR ART DOCUMENT

Patent Document

Patent Document 1: JP 2017-131056 A

SUMMARY OF THE INVENTION

Problems to be Solved

The inclination angle of the wire harness passing through the attachment hole and the grommet varies depending on the vehicle design. The inventors of the present invention have considered a configuration that enables grommets to be commonly used regardless of the inclination angle of the wire harness, and that can improve the sound insulation performance of the grommets.

An object of the present disclosure is to provide a grommet that can be commonly used and improve sound insulation.

Means to Solve the Problem

A grommet according to the present disclosure is a grommet that is to be attached to an attachment hole of a panel through which a wire harness is passed, the grommet including: a main body that includes a seal portion configured to come into contact with the panel; a tubular portion into which the wire harness is to be inserted; and a pair of coupling portions that are provided with a space therebetween in an axial direction of the grommet, and that each couple the main body and the tubular portion to each other, wherein at least one of the pair of coupling portions includes a flexible portion configured to bend so as to absorb an inclination of the wire harness with respect to the panel, and the pair of coupling portions provide a sound insulation space therebetween.

Effect of the Invention

A grommet according to the present disclosure can be commonly used and improve sound insulation.

DETAILED DESCRIPTION TO EXECUTE THE INVENTION

Description of Embodiments of Present Disclosure

Figure 1:
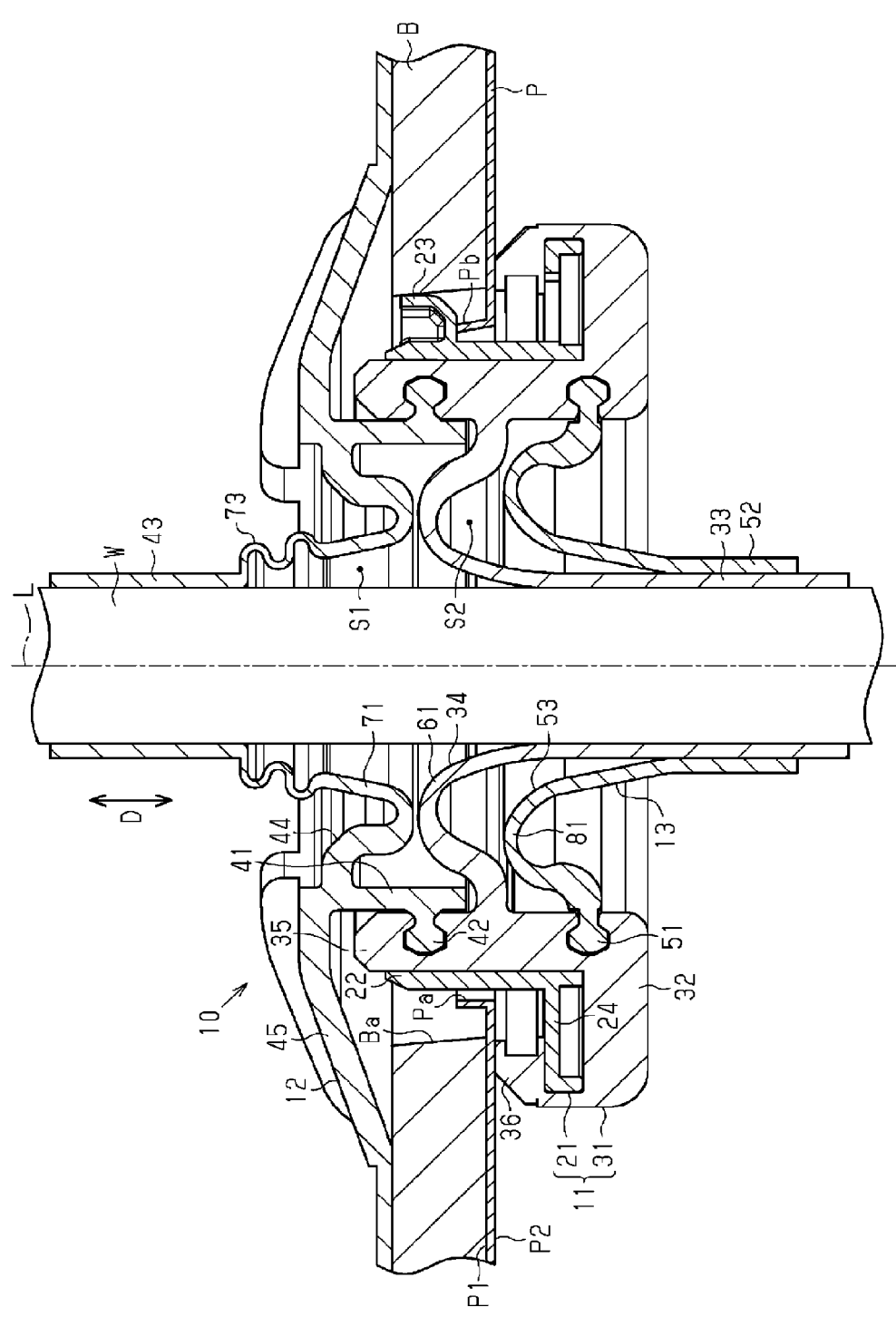
FIG. 1 is a cross-sectional view of a grommet according to an embodiment.

First, embodiments of the present disclosure will be listed and described.

[1] A grommet according to the present disclosure is a grommet that is to be attached to an attachment hole of a panel through which a wire harness is passed, the grommet including: a main body that includes a seal portion configured to come into contact with the panel; a tubular portion into which the wire harness is to be inserted; and a pair of coupling portions that are provided with a space therebetween in an axial direction of the grommet, and that each couple the main body and the tubular portion to each other, wherein at least one of the pair of coupling portions includes a flexible portion configured to bend so as to absorb an inclination of the wire harness with respect to the panel, and the pair of coupling portions provide a sound insulation space therebetween.

With this configuration, when the inclination angle of the wire harness passing through the attachment hole is changed, the inclination of the wire harness can be absorbed by the bending of the flexible portion of the coupling portion. That is to say, even if the tubular portion is inclined to follow the inclination of the wire harness, the bending of the flexible portion of the coupling portion can suppress the deformation of the main body including the seal portion. As a result, the flexible portion can suppress the influence of the inclination of the wire harness on the sealing performance of the seal portion. As a result, the grommet can be commonly used regardless of the inclination angle of the wire harness. Furthermore, with this configuration, the sound insulation space provided by the pair of coupling portions can improve sound insulation performance.

[2] The flexible portion includes a first thin portion that has a thinner wall thickness than the main body.

With this configuration, the thin portion provided in the flexible portion makes it possible to more desirably absorb the inclination of the wire harness.

[3] The flexible portion includes a bent portion that has a bent shape protruding in the axial direction.

With this configuration, the bent portion provided in the flexible portion makes it possible to more desirably absorb the inclination of the wire harness.

[4] The flexible portion includes a bellows portion that has a tubular shape coaxial with the tubular portion.

With this configuration, the bellows portion provided in the flexible portion makes it possible to more desirably absorb the inclination of the wire harness.

[5] The flexible portion is provided so as to be entirely continuous in a circumferential direction thereof.

With this configuration, it is possible to absorb a larger inclination of the wire harness than when the flexible portion is provided intermittently in the circumferential direction thereof.

[6] The main body includes a first member that is coupled to the tubular portion by one of the pair of coupling portions, and a second member that is coupled to the tubular portion by the other of the pair of coupling portions, the first member includes the sealing portion, the second member includes a covering portion configured to cover an insertion hole of a sound insulation member provided on one side surface of the panel, and the flexible portion is provided at least in the coupling portion that couples the second member to the tubular portion.

With this configuration, the flexible portion provided in the coupling portion can suppress the deformation of the covering portion caused by the inclination of the wire harness with respect to the panel. As a result, regardless of the inclination angle of the wire harness, the covering portion can be brought into contact with the sound insulation member without a gap, and accordingly the sound insulation performance can be further improved.

[7] The flexible portion formed in the coupling portion that couples the second member to the tubular portion includes a second thin portion that is thinner than the covering portion.

With this configuration, the second thin portion deforms more easily than the covering portion. Therefore, the second thin portion makes it possible to more desirably suppress the deformation of the covering portion caused by the inclination of the wire harness with respect to the panel.

Details of Embodiments of Present Disclosure

Hereinafter, specific examples of a grommet according to the present disclosure will be described with reference to the drawings. In each drawing, for convenience of explanation, some parts of the configuration may be exaggerated or simplified. In addition, the dimensional ratio of each part may differ in each drawing. The term "orthogonal" in the present specification is not limited to being strictly orthogonal, but may be substantially orthogonal within the range in which the actions and effects of the embodiments can be exhibited.

The term "tubular" used in the descriptions in the present specification is not limited to referring to a shape with a circumferential wall that is formed so as to be continuous all the way in the circumferential direction thereof, but may refer to a tubular shape constituted by a combination of a plurality of parts, or a shape with a cutout in a portion in a circumferential direction thereof, such as a C-shape. Examples of a "tubular" shape include a circular shape, an elliptical shape, and a polygonal shape with sharp or rounded corners. Also, the term "annular" used in the descriptions in the present specification may refer to any structure that provides a loop, a continuous shape with no ends, and a typical loop shape with a C-shaped gap. Note that examples of an "annular" shape include, but are not limited to, a circular shape, an elliptical shape, and a polygonal shape with sharp or rounded corners.

Also, "(to) face" in the present specification means that surfaces or members are located right in front of each other, and refers to not only cases in which the entirety of the surfaces or members are located right in front of each other, but also cases in which portions of the surfaces or members are located right in front of each other. Also, "(to) face" in the present specification means both a case in which a member different from two portions is interposed between the two portions and a case in which nothing is interposed between the two portions.

As shown in FIG. 1, a grommet 10 according to the present embodiment is attached to an attachment hole Pa formed in a vehicle body panel P of a vehicle. The grommet 10 ensures watertightness in the attachment hole Pa of the vehicle body panel P. The grommet 10 also serves to prevent a wire harness W from interfering with the periphery of the attachment hole Pa. Note that the wire harness W includes at least one electric wire. The wire harness W is inserted into the grommet 10 in an insertion direction D. The direction in which an axis L of the grommet 10 extends coincides with the insertion direction D in which the wire harness W is inserted into the grommet 10, for example. In the following description, the direction in which the axis L of the grommet 10 extends may simply be referred to as the "axial direction". Also, the circumferential direction with respect to the axis L at the center and the radial direction with respect to the axis L at the center may be simply referred to as the "circumferential direction" and the "radial direction", respectively.

The vehicle body panel P is, for example, a panel that separates the interior of the vehicle from the exterior of the vehicle. The exterior of the vehicle is, for example, an engine room. Of the two surfaces of the vehicle body panel P, the surface facing the interior of the vehicle is defined as a first surface P1, and the surface facing the exterior of the vehicle is defined as a second surface P2. A protruding portion Pb that protrudes from the periphery of the attachment hole Pa toward the first surface P1, for example, is provided for the attachment hole Pa of the vehicle body panel P. The protruding portion Pb is formed by bending the periphery of the attachment hole Pa toward the first surface P1. The protruding portion Pb is formed by performing burring processing, for example. The protruding portion Pb is formed around the entire circumference of the attachment hole Pa. The grommet 10 is attached to the attachment hole Pa from the second surface P2 side, for example.

A sound insulation member B is attached to the first surface P1 of the vehicle body panel P. Examples of the material of sound insulation member B include a non-woven fabric, a rubber plate, a foam material, and so on. An insertion hole Ba into which the wire harness W is inserted is formed in the sound insulation member B at a position corresponding to the attachment hole Pa.

(Overall Structure of Grommet 10)

Figure 2:
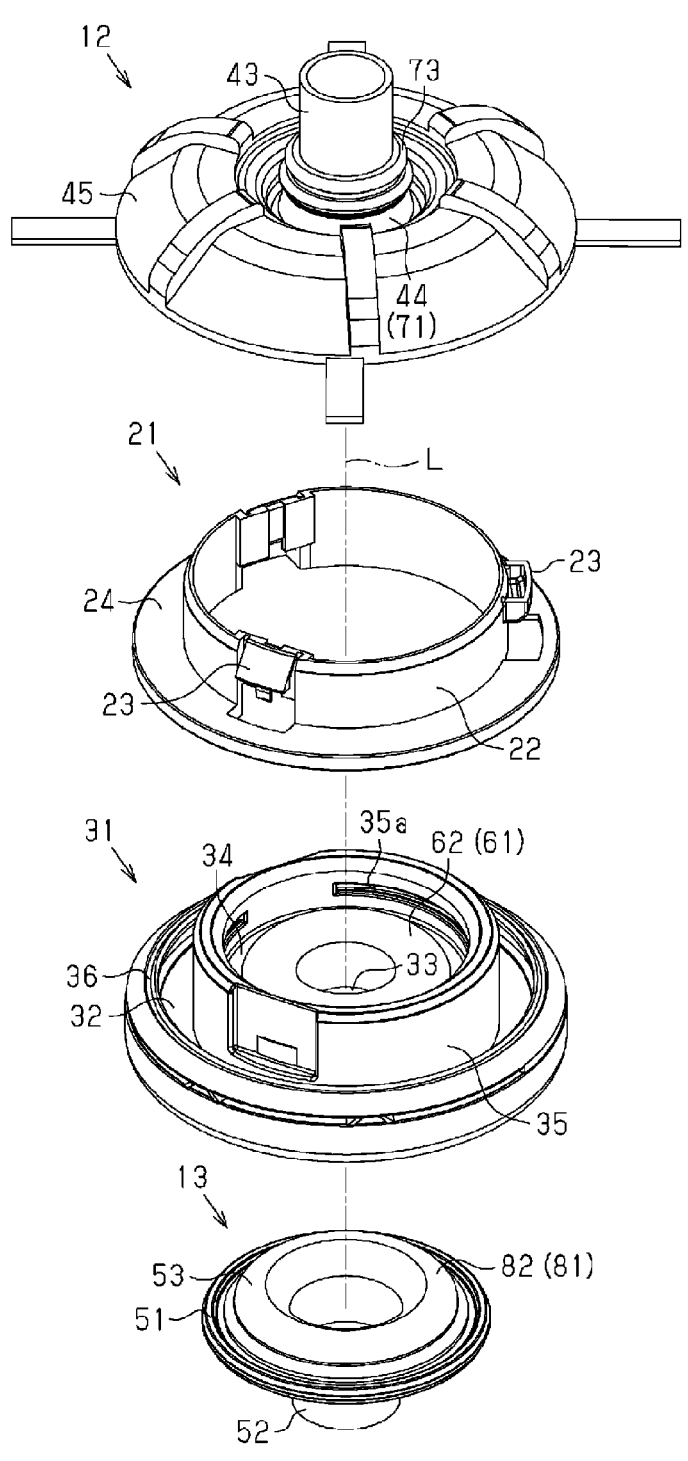
FIG. 2 is an exploded perspective view of the grommet according to the same embodiment.

As shown in FIGS. 1 and 2, the grommet 10 includes a first member 11, a second member 12, and a third member 13. The second member 12 and the third member 13 are each separate from the first members 11. The second member 12 is attached to one side of the first member 11 in the insertion direction D. The third member 13 is attached to the other side of the first member 11 in the insertion direction D.

(First Member 11)

The first member 11 includes an inner portion 21 and an outer portion 31, for example. The inner portion 21 and the outer portion 31 are separate parts made of different kinds of materials. The outer portion 31 is made of a highly flexible material. Examples of the constituent material of the outer portion 31 include an elastomer such as EPDM (i.e., ethylene propylene diene rubber). The inner portion 21 is made of a material having higher rigidity than the outer portion 31. That is to say, the inner portion 21 is formed so as not to be easily deformed as a whole. Examples of the constituent material of the inner portion 21 include a synthetic resin material such as PP (i.e., polypropylene). The inner portion 21 and the outer portion 31 are, for example, injection molded products.

(Inner Portion 21)

The inner portion 21 has a tubular base portion 22 that is inserted into the attachment hole Pa. The base portion 22 has an annular shape extending along the periphery of the attachment hole Pa. The base portion 22 has an annular shape slightly smaller than the periphery of the attachment hole Pa. As shown in FIG. 2, the base portion 22 is provided with a locking piece 23 that can be locked to the peripheral edge of the assembly hole Pa. As a result of the locking piece 23 being locked to the periphery of the attachment hole Pa, the grommet 10 is fixed to the vehicle body panel P.

The inner portion 21 has a flange portion 24 extending outward from the base portion 22. The flange portion 24 is provided around one end of the base portion 22 in the axial direction thereof, for example. The outer shape of the flange portion 24 is larger than that of the attachment hole Pa. In the state where the grommet 10 is attached to the vehicle body panel P, the flange portion 24 is positioned on the second surface P2 side of the vehicle body panel P. Hereinafter, "the state where the grommet 10 is attached to the vehicle body panel P" may simply be referred to as the "attached state".

(Outer Portion 31)

The outer portion 31 integrally includes a first base portion 32, a first tubular portion 33 into which the wire harness W is inserted, and a first coupling portion 34 that couples the first tubular portion 33 and the first base portion 32 to each other. The first tubular portion 33 has, for example, an annular cross-sectional shape centered about the axis L of the grommet 10. The first tubular portion 33 extends along the axis L of the grommet 10. The first tubular portion 33 is a portion that is included in the outer portion 31 and comes into close contact with the outer circumferential surface of the wire harness W. Such a configuration ensures watertightness between the wire harness W and the first tubular portion 33.

The first base portion 32 includes an inner tubular portion 35 that is positioned inside the base portion 22 of the inner portion 21 and a seal portion 36 formed integrally with the inner tubular portion 35. The inner tubular portion 35 has a tubular shape extending along the axis L of the grommet 10. The inner tubular portion 35 has, for example, an annular cross-sectional shape centered about the axis L of the grommet 10. The inner tubular portion 35 is in contact with the inner circumferential surface of the base portion 22 of the inner portion 21. The seal portion 36 has an annular shape surrounding the attachment hole Pa. The seal portion 36 is sandwiched and compressed between the flange portion 24 and the second surface P2 of the vehicle body panel P. Thus, as a result of the seal portion 36 elastically coming into contact with the second surface P2, watertightness is achieved between the seal portion 36 and the second surface P2.

(Second Member 12)

Figure 3:
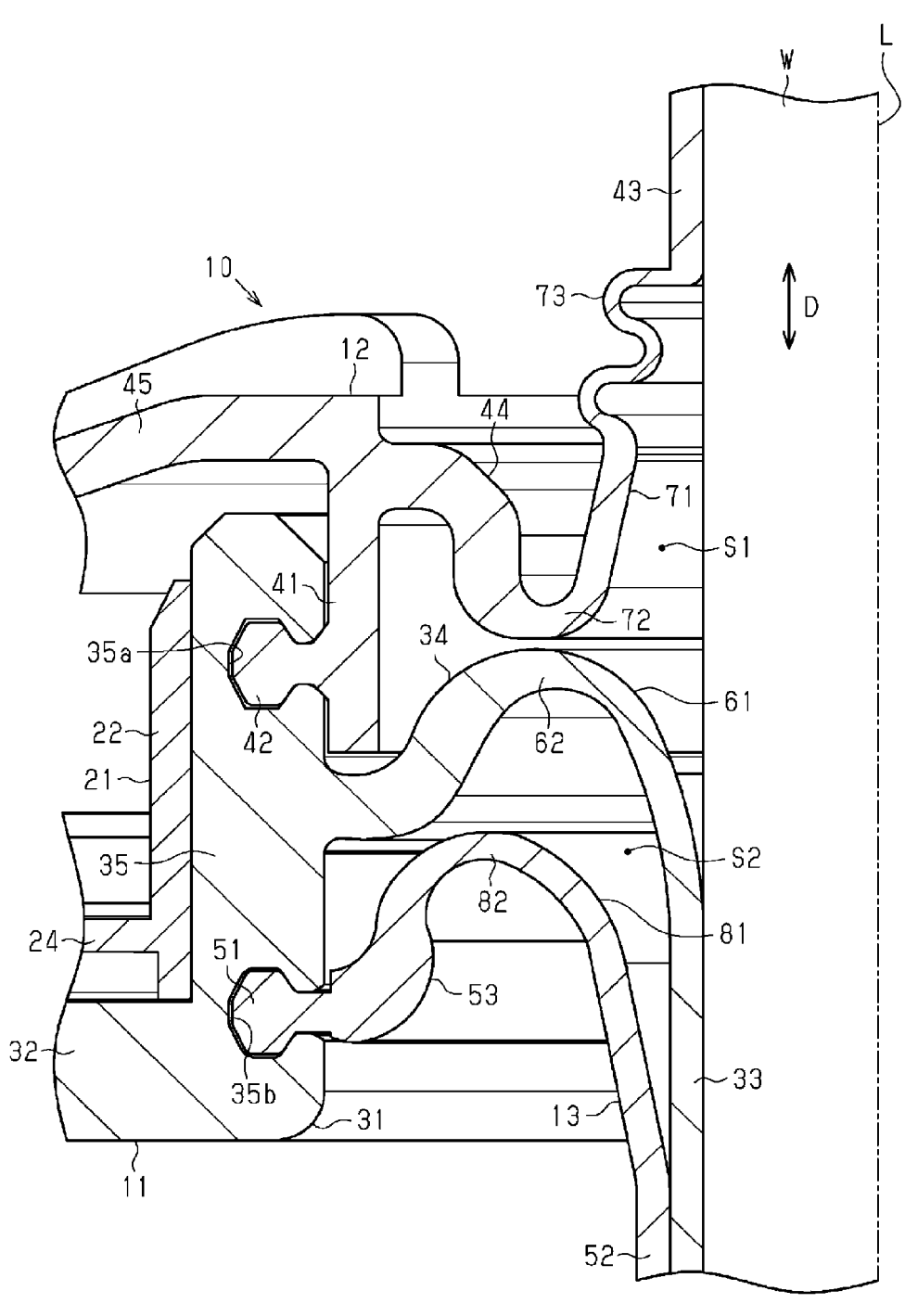
FIG. 3 is an enlarged cross-sectional view showing a portion of the grommet according to the same embodiment.

As shown in FIG. 3, the second member 12 integrally includes a second base portion 41, a first fixing portion 42, a second tubular portion 43, a second coupling portion 44, and a covering portion 45. The second member 12 is made of a highly flexible material. Examples of the constituent material of the second member 12 include an elastomer such as EPDM (i.e., ethylene propylene diene rubber). The second member 12 is, for example, an injection molded product.

The second base portion 41 has a tubular shape extending along the axis L of the grommet 10. The second base portion 41 has, for example, an annular cross-sectional shape centered about the axis L of the grommet 10. The second base portion 41 is positioned inside the inner tubular portion 35 of the first base portion 32. The inner circumferential surface of the second base portion 41 is in contact with the outer circumferential surface of the inner tubular portion 35 of the first base portion 32. The second base portion 41 constitutes the main body of the grommet 10 according to the present embodiment together with the first base portion 32.

The first fixing portion 42 is a portion fixed to the first base portion 32. The first fixing portion 42 is a protruding portion protruding from the outer circumferential surface of the second base portion 41, for example. The first fixing portion 42 is fitted into a coupling recessed portion 35a formed in the inner circumferential surface of the inner tubular portion 35.

The second tubular portion 43 has, for example, an annular cross-sectional shape centered about the axis L of the grommet 10. The second tubular portion 43 extends along the axis L of the grommet 10. The second tubular portion 43 is a portion that is included in the second member 12 and comes into close contact with the outer circumferential surface of the wire harness W. Such a configuration ensures watertightness between the wire harness W and the second tubular portion 43.

As shown in FIG. 1, the covering portion 45 extends outward from the outer circumferential surface of the second base portion 41 in the radial direction. The covering portion 45 has a circular shape centered about the axis L, for example. The covering portion 45 has a tapered shape with the diameter thereof increasing toward the vehicle body panel P in the axial direction. In the state where the grommet 10 is attached to the vehicle body panel P, the peripheral portion of the covering portion 45 elastically abuts against the sound insulation member B. With such a configuration, the covering portion 45 covers the insertion hole Ba of the sound insulation member B.

(Third Member 13)

The third member 13 integrally includes a second fixing portion 51 that is fixed to the first base portion 32, a third tubular portion 52 into which the wire harness W is inserted, and a third coupling portion 53 that couples the second fixing portion 51 and the third tubular portion 52 to each other. The third member 13 is made of a highly flexible material. Examples of the constituent material of the third member 13 include an elastomer such as EPDM (i.e., ethylene propylene diene rubber). The third member 13 is, for example, an injection molded product. The elastic materials used in the outer portion 31 of the first member 11, the second member 12, and the third member 13 may be the same material or different materials, but it is preferable that they are all elastic materials that are flexible.

The second fixing portion 51 is a portion fixed to the first base portion 32. The second fixing portion 51 is a protruding portion protruding from the outer circumferential surface of the second base portion 41. The second fixing portion 51 is fitted into a coupling recessed portion 35b formed in the inner circumferential surface of the inner tubular portion 35.

The third tubular portion 52 has, for example, an annular cross-sectional shape centered about the axis L of the grommet 10. The third tubular portion 52 extends along the axis L of the grommet 10. The third tubular portion 52 is, for example, a portion that is included in the third member 13 and comes into close contact with the outer circumferential surface of the first tubular portion 33. Such a configuration ensures watertightness between the first tubular portion 33 and the third tubular portion 52.

(First to Third Coupling Portions 34, 44, and 53)

The first coupling portion 34 of the outer portion 31 couples the first base portion 32 that constitutes a portion of the main body of the grommet 10 and the first tubular portion 33 to each other. The second coupling portion 44 of the second member 12 couples the second base portion 41 that constitutes a portion of the main body of the grommet 10 and the second tubular portion 43 to each other. The third coupling portion 53 of the third member 13 couples the first base portion 32 and the third tubular portion 52 to each other. The first coupling portion 34, the second coupling portion 44, and the third coupling portion 53 are spaced apart from each other in the axial direction. The first coupling portion 34 is positioned between the second coupling portion 44 and the third coupling portion 53 in the axial direction.

(First Coupling Portion 34)

As shown in FIG. 3, the first coupling portion 34 includes a first flexible portion 61. The first flexible portion 61 is configured to be able to bend so as to absorb the inclination of the wire harness W with respect to the vehicle body panel P. The first flexible portion 61 includes a bent portion 62 that has a bent shape folded back so as to protrude in the axial direction. For example, the bent portion 62 is bent so as to protrude toward the second coupling portion 44 in the axial direction. The bent portion 62 is provided so as to be entirely continuous in the circumferential direction thereof. The wall thickness of the bent portion 62 is thinner than the wall thickness of the first base portion 32 in the radial direction. That is to say, the bent portion 62 according to the present embodiment is formed as a first thin portion. The inner end of the bent portion 62 in the radial direction is connected to one end of the first tubular portion 33 in the axial direction.

(Second Coupling Portion 44)

The second coupling portion 44 includes a second flexible portion 71. The second flexible portion 71 is configured to be able to bend so as to absorb the inclination of the wire harness W with respect to the vehicle body panel P.

The second flexible portion 71 includes a bent portion 72 that has a bent shape folded back so as to protrude in the axial direction. For example, the bent portion 72 is bent so as to protrude toward the first coupling portion 34 in the axial direction. The bent portion 72 is provided so as to be entirely continuous in the circumferential direction thereof. The wall thickness of the bent portion 72 is thinner than the wall thickness of the first base portion 32 in the radial direction. That is to say, the bent portion 72 according to the present embodiment is formed as a first thin portion. A portion of the bent portion 72 is formed so as to be thinner than the wall thickness of the covering portion 45 in the axial direction. That is to say, the bent portion 72 according to the present embodiment is also formed as a second thin portion.

The second flexible portion 71 includes a bellows portion 73. The bellows portion 73 is formed between the inner end of the bent portion 72 in the radial direction and one end of the first tubular portion 33 in the axial direction. The bellows portion 73 has a tubular shape coaxial with the second tubular portion 43. The diameter of the bellows portion 73 is set to be larger than the diameter of the second tubular portion 43. The bellows portion 73 has, for example, an annular cross-sectional shape centered about the axis L of the grommet 10. The bellows portion 73 has a bellows structure in which annular protruding portions and annular recessed portions having a smaller outer diameter than the protruding portions are alternatingly provided in the axial direction. The wall thickness of the bellows portion 73 in the radial direction is thinner than the wall thickness of the bent portion 72, for example.

(Third Coupling Portion 53)

The third coupling portion 53 includes a third flexible portion 81. The third flexible portion 81 is configured to be able to bend so as to absorb the inclination of the wire harness W with respect to the vehicle body panel P. The third flexible portion 81 includes a bent portion 82 that has a bent shape folded back so as to protrude in the axial direction. For example, the bent portion 82 is bent so as to protrude toward the first coupling portion 34 in the axial direction. The bent portion 82 is provided so as to be entirely continuous in the circumferential direction thereof. The wall thickness of the bent portion 82 is thinner than the wall thickness of the first base portion 32 in the radial direction. That is to say, the bent portion 82 according to the present embodiment is formed as a first thin portion. The inner end of the bent portion 82 in the radial direction is connected to one end of the third tubular portion 52 in the axial direction.

The first coupling portion 34 and the second coupling portion 44 face each other in the axial direction of the grommet 10 with a space therebetween. The first coupling portion 34 and the second coupling portion 44 provide a first sound insulation space S1 therebetween. The first coupling portion 34 and the third coupling portion 53 face each other in the axial direction of the grommet 10 with a space therebetween. The first coupling portion 34 and the third coupling portion 53 provide a second sound insulation space S2 therebetween. That is to say, the first sound insulation space S1 and the second sound insulation space S2 that are separated from each other by the first coupling portion 34 are formed inside the grommet 10. The first sound insulation space S1 and the second sound insulation space S2 are arranged side by side in the insertion direction D of the wire harness W. Note that the third tubular portion 52 according to the present embodiment is in close contact with the outer circumferential surface of the first tubular portion 33. As a result, the second sound insulation space S2 is a space closed only by the outer portion 31 of the first member 11 and the third member 13.

The effects of the present embodiment will be described.

Figure 4:
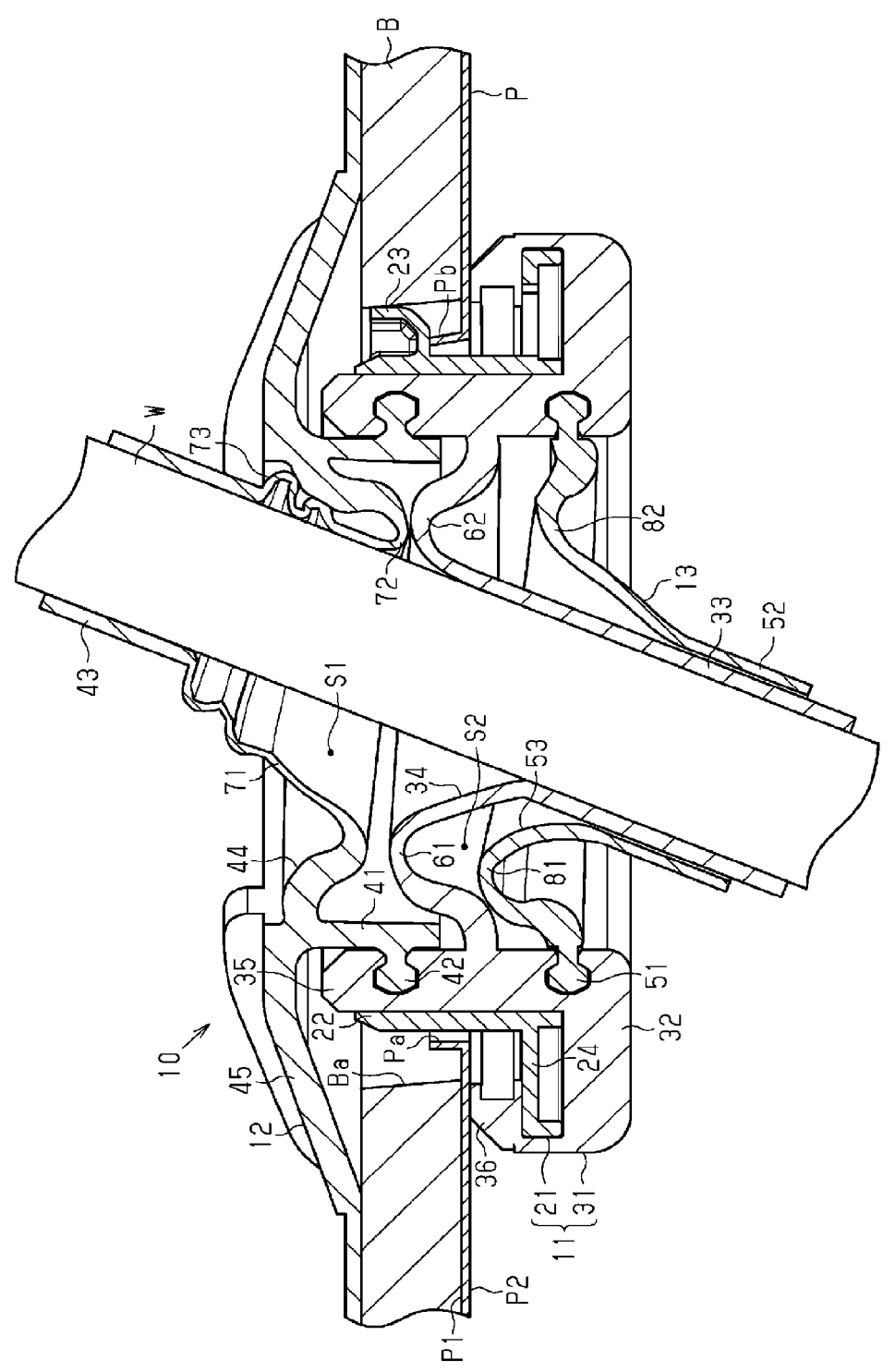
FIG. 4 is a cross-sectional view showing actions of the grommet according to the same embodiment.

(1) The grommet 10 includes a first base portion 32 and a second base portion 41 that constitute the main body of the grommet 10, and first to third tubular portions 33, 43, and 52 into which a wire harness W is inserted. In addition, the grommet 10 includes a first coupling portion 34 that couples the first tubular portion 33 and the first base portion 32 to each other, a second coupling portion 44 that couples the second tubular portion 43 and the second base portion 41 to each other, and a third coupling portion 53 that couples the third tubular portion 52 and the first base portion 32 to each other. The first to third coupling portions 34, 44, and 53 respectively include first to third flexible portions 61, 71, and 81 that can bend so as to absorb the inclination of the wire harness W with respect to a vehicle body panel P. As a result, as shown in FIG. 4, when the inclination angle of the wire harness W passing through the attachment hole Pa is changed, the inclination of the wire harness W can be absorbed by the bending of the first to third flexible portions 61, 71, and 81. That is to say, even if the first to third tubular portions 33, 43, and 52 are inclined to follow the inclination of the wire harness W, the bending of the first to third flexible portions 61, 71, and 81 can suppress the deformation of the first base portion 32 including a seal portion 36. Thus, the first to third flexible portions 61, 71, and 81 can suppress the influence of the inclination of the wire harness W on the sealing performance of the seal portion 36. As a result, the grommet 10 can be commonly used regardless of the inclination angle of the wire harness W.

Furthermore, the first coupling portion 34 and the second coupling portion 44 are provided with a space therebetween in the axial direction of the grommet 10. Also, the first coupling portion 34 and the third coupling portion 53 are provided with a space therebetween in the axial direction of the grommet 10. The first coupling portion 34 and the second coupling portion 44 provide a first sound insulation space S1 therebetween. The first coupling portion 34 and the third coupling portion 53 provide a second sound insulation space S2 therebetween. With this configuration, the first sound insulation space S1 and the second sound insulation space S2 formed by the first to third coupling portions 34, 44, and 53 improve sound insulation.

(2) The first to third flexible portions 61, 71, and 81 respectively includes bent portions 62, 72, and 82, which are first thin portions whose wall thicknesses are thinner than the wall thickness of the first base portion 32 in the radial direction. With this configuration, the bent portions 62, 72, and 82, which are first thin portions, provided in the first to third coupling portions 34, 44, and 53, make it possible to more desirably absorb the inclination of the wire harness W.

(3) The first to third flexible portions 61, 71, and 81 respectively include bent portions 62, 72, and 82 that each have a bent shape protruding in the axial direction. With this configuration, the bent portions 62, 72, and 82 provided in the first to third coupling portions 34, 44, and 53 make it possible to more desirably absorb the inclination of the wire harness W.

(4) The second flexible portion 71 includes a bellows portion 73 that has a tubular shape coaxial with the second tubular portion 43. With this configuration, the bellows portion 73 provided in the second flexible portion 71 makes it possible to more desirably absorb the inclination of the wire harness W.

(5) The first to third flexible portions 61, 71, and 81 are provided so as to be entirely continuous in the circumferential direction thereof. With this configuration, it is possible to absorb a larger inclination of the wire harness W than when each of the first to third flexible portions 61, 71, and 81 is provided intermittently in the circumferential direction thereof.

(6) The main body of the grommet 10 includes a first base portion 32 that constitutes a portion of the first member 11 and a second base portion 41 that constitutes a portion of the second member 12. The first base portion 32 is coupled to the first tubular portion 33 by the first coupling portion 34. The second base portion 41 is coupled to the second tubular portion 43 by the second coupling portion 44. The second member 12 is provided with a covering portion 45 extending from the second base portion 41 and configured to cover the insertion hole Ba of the sound insulation member B.

With this configuration, the covering portion 45 of the second member 12 covering the insertion hole Ba of the sound insulation member B can improve sound insulation performance. In addition, the second coupling portion 44 that couples the second base portion 41 including the covering portion 45 and the second tubular portion 43 to each other is provided with a second flexible portion 71.

Therefore, the second flexible portion 71 can suppress the deformation of the covering portion 45 caused by the inclination of the wire harness W with respect to the vehicle body panel P. With this configuration, it is possible to bring the covering portion 45 into contact with the sound insulation member B without a gap regardless of the inclination angle of the wire harness W. As a result, it is possible to prevent sound insulation performance from being deteriorated due to a gap formed between the covering portion 45 and the sound insulation member B.

(7) The second flexible portion 71 includes a bent portion 72 that is a second thin portion that is thinner than the covering portion 45. With this configuration, it is possible to form the bent portion 72 so as to be more deformable than the covering portion 45. Therefore, the deformation of the covering portion 45 resulting from the inclination of the wire harness W with respect to the vehicle body panel P can be more desirably suppressed by the bent portion 72.

(8) The grommet 10 includes a first member 11, a second member 12, and a third member 13. The first member 11 includes a seal portion 36 that comes into contact with the vehicle body panel P. The second member 12, which includes the second tubular portion 43 into which the wire harness W is inserted, is attached to one side of the first member 11 in the insertion direction D. The third member 13, which includes the third tubular portion 52 into which the wire harness W is inserted, is attached to the other side of the first member 11 in the insertion direction D.

With this configuration, the grommet 10 includes at least three members, and therefore, when the design of the grommet 10 is changed according to the vehicle design, at least one of the first to third members 11, 12, and 13 can be used commonly without changing the design thereof. For example, when the layout of the portion of the wire harness W to be led out toward the second member 12 is changed, it is possible to address such a change by changing the design of only the second member 12 of the first to third members 11, 12, and 13. Also, for example, when the diameter of the attachment hole Pa of the vehicle body panel P is changed, it is possible to address such a change by changing the wall thickness of the first member 11 in the radial direction, and there is no need to change the designs of the second member 12 and the third member 13. In this way, it is possible to reduce changes in the design of the grommet 10 according to the vehicle design.

(9) The first member 11 includes a first base portion 32 that includes a seal portion 36, a first tubular portion 33 into which the wire harness W is inserted, and a first coupling portion 34 that couples the first tubular portion 33 and the first base portion 32 to each other. The second member 12 includes a first fixing portion 42 that is fixed to the first base portion 32, and a second coupling portion 44 that couples the first fixing portion 42 and the second tubular portion 43 to each other. The third member 13 includes a second fixing portion 51 that is fixed to the first base portion 32, and a third coupling portion 53 that couples the second fixing portion 51 and the third tubular portion 52 to each other. With this configuration, it is possible to form the grommet 10 from the first to third members 11, 12, and 13 by respectively fixing the first fixing portion 42 of the second member 12 and the second fixing portion 51 of the third member 13 to the first base portion 32 of the first member 11.

(10) A first sound insulation space S1 and a second sound insulation space S2 that are insulated from each other by the first coupling portion 34 are formed inside the grommet 10. The first sound insulation space S1 and the second sound insulation space S2 can improve sound insulation performance. Furthermore, in this configuration, the first sound insulation space S1 and the second sound insulation space S2 are arranged side by side in the insertion direction D of the wire harness W. As a result, the sound transmitted through the attachment hole Pa between the interior and the exterior of the vehicle partitioned by the vehicle body panel P can be insulated stepwise by the first sound insulation space S1 and the second sound insulation space S2 of the grommet 10.

The present embodiment can be implemented with the following modifications. The present embodiment and the following modifications may be implemented in combination with each other as long as no technical inconsistencies arise.

The configurations such as the shapes of the first to third flexible portions 61, 71, and 81 are not limited to those of the above embodiment, and may be modified as appropriate. For example, in the first to third flexible portions 61, 71, and 81, the direction in which the bent portions 62, 72, and 82 protrude, which is the axial direction, is not limited to that in the above-embodiment, and may be modified as appropriate.

Figure 5:
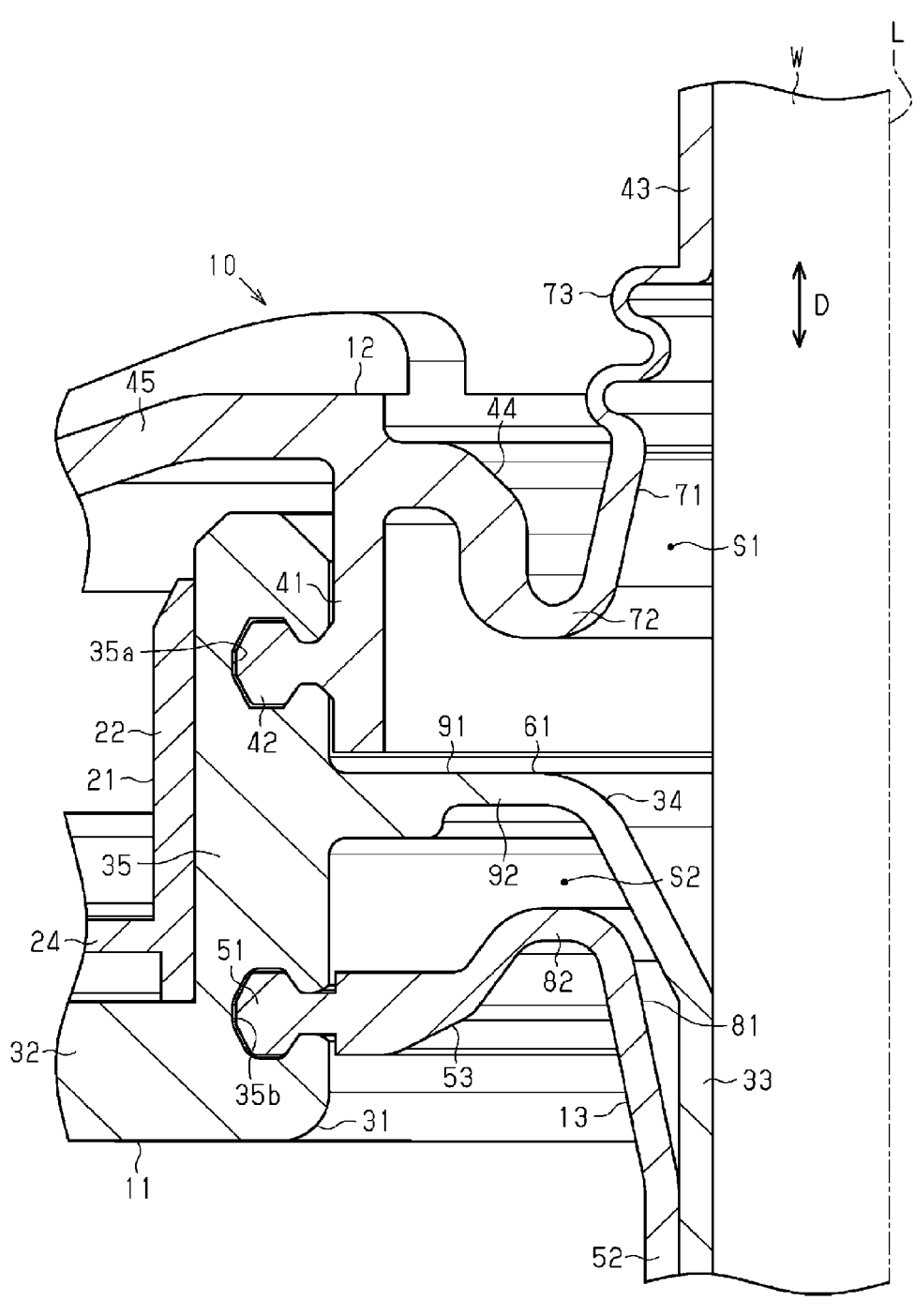
FIG. 5 is an enlarged cross-sectional view showing a portion of a grommet according to a modification.

In the configuration shown in FIG. 5, for example, the shape of the first flexible portion 61 is modified from that of the above embodiment. As shown in the figure, the first flexible portion 61 includes a flat plate portion 91. For example, the flat plate portion 91 is formed in a flat plate shape that is orthogonal to the axis L. The first flexible portion 61 in this example does not include the bent portion 62 of the first flexible portion 61 of the above embodiment. The flat plate portion 91 is provided so as to be entirely continuous in the circumferential direction of the first flexible portion 61. The flat plate portion 91 includes a first thin portion 92, for example. The wall thickness of the first thin portion 92 in the axial direction is thinner than the wall thickness of the first base portion 32 in the radial direction. As a result, the first flexible portion 61 can easily bend according to the inclination of the wire harness W. The inner edge of the flat plate portion 91 in the radial direction is connected to one end of the first tubular portion 33 in the axial direction.

With the configuration shown in FIG. 5, the first flexible portion 61 does not include a bent portion that is folded back so as to protrude in the axial direction. Therefore, in the state where the first to third flexible portions 61, 71, and 81 are deformed according to the inclination of the wire harness W, it is possible to prevent the first flexible portion 61 from interfering with the second flexible portion 71 and the third flexible portion 81.

In the above embodiment, the first to third coupling portions 34, 44, and 53 respectively include flexible portions (the first to third flexible portions 61, 71, and 81). However, the present invention is not limited to such a configuration, and one or two of the first to third flexible portions 61, 71, and 81 may be omitted.

A coupling structure in which the first fixing portion 42 and the coupling recessed portion 35a of the first base portion 32 are structurally interchanged may be employed. Similarly, a coupling structure in which the second fixing portion 51 and the coupling recessed portion 35b of the first base portion 32 are structurally interchanged may be employed.

The second member 12 in the above embodiment is configured to be fixed to the inner circumferential surface of the first base portion 32 at the first fixing portion 42. However, in addition to such a configuration, for example, the second member 12 may be configured to be fixed to the end surface of the first base portion 32 in the axial direction.

The shape of the covering portion 45, as viewed in the direction in which the axis L extends, is not limited to being circular, and may be changed to an elliptical shape, a polygonal shape, or the like, as appropriate.

The shape of the seal portion 36, as viewed in the direction in which the axis L extends, is not limited to being circular, and may be changed to an elliptical shape or the like according to the shape of the attachment hole Pa, as appropriate.

In the grommet 10 according to the above embodiment, either the third member 13 or the second member 12 including the covering portion 45 may be omitted. In addition, in the above embodiment, the outer portion 31 of the first member 11 and the second member 12 may be integrally formed instead of being separate members. In addition, in the above embodiment, the outer portion 31 of the first member 11 and the third member 13 may be integrally formed instead of being separate members.

In the above embodiment, the grommet 10 is constituted by the first to third members 11, 12, and 13. However, the present invention is not limited to such a configuration. In addition to the first to third members 11, 12, and 13, one or more members may be added.

The elastic material used for the outer portion 31 of the first member 11, the second member 12, and the third member 13 is not limited to EPDM. Alternatively, for example, NBR (acrylonitrile-butadiene rubber) or the like may be used.

The first member 11 in the above embodiment includes the inner portion 21, and the outer portion 31. However, the present invention is not limited to such a configuration, and the inner portion 21 may be omitted from the first member 11 in the above embodiment.

In the present embodiment, the protruding portion Pb at the periphery of the attachment hole Pa protrudes toward the first surface P1. However, the present invention is not limited to such a configuration, and the protruding portion Pb may be configured to protrude toward the second surface P2. A configuration in which the protruding portion Pb is omitted from the attachment hole Pa of the above embodiment, i.e., a configuration in which the attachment hole Pa is not subjected to burring processing may be employed.

As shown in FIG. 1, the bent portion 62 of the first flexible portion 61 and the bent portion 72 of the second flexible portion 71 may be formed so as to face each other in the axial direction of the grommet 10. The bent portion 82 of the third flexible portion 81 may be formed to protrude in the same direction as the bent portion 62 of the first flexible portion 61 in the axial direction of the grommet 10.

As shown in FIG. 1, the third tubular portion 52 may be positioned so that the third tubular portion 52 overlaps the outer side of the first tubular portion 33.

As shown in FIGS. 1 and 2, the inner tubular portion 35 of the outer portion 31 may be inserted into the base portion 22 of the inner portion 21, and the flange portion 24 of the inner portion 21 may be fitted into the gap between the inner tubular portion 35 and the seal portion 36 of the outer portion 31.

The embodiments and modifications disclosed herein are exemplifications in all respects, and the present invention is not limited to these exemplifications. That is to say, the scope of the present invention is indicated by the scope of claims, and is intended to include all changes within the meaning and scope of equivalence to the scope of claims.

LIST OF REFERENCE NUMERALS

10 Grommet
11 First Member
12 Second Member
13 Third Member
21 Inner Portion
22 Base Portion
23 Locking Piece
24 Flange Portion
31 Outer Portion
32 First Base Portion included in Main Body
33 First Tubular Portion (Tubular Portion)
34 First Coupling Portion (Coupling Portion)
35 Inner Tubular Portion
35 Coupling Recessed Portion
35b Coupling Recessed Portion
36 Seal Portion
41 Second Base Portion included in Main Body
42 First Fixing Portion
43 Second Tubular Portion (Tubular Portion)
44 Second Coupling Portion (Coupling Portion)
45 Covering Portion
51 Second Fixing Portion
52 Third Tubular Portion (Tubular Portion)
53 Third Coupling Portion (Coupling Portion)
61 First Flexible Portion (Flexible Portion)
62 Bent Portion (First Thin Portion)
71 Second Flexible Portion (Flexible Portion)
72 Bent Portion (First Thin Portion, Second Thin Portion)
73 Bellows Portion
81 Third Flexible Portion (Flexible Portion)
82 Bent Portion (First Thin Portion)
91 Flat Plate Portion
92 First Thin Portion
B Sound Insulation Member
Ba Insertion Hole
D Insertion Direction
L Axis
P Vehicle Body Panel (Panel)
P1 First Surface (One Side Surface)
P2 Second Surface
Pa Attachment Hole
Pb Protruding Portion
S1 First Sound Insulation Space (Sound Insulation Space)
S2 Second Sound Insulation Space (Sound Insulation Space)
W Wire Harness

What is claimed is:

1. A grommet comprising:
a main body that includes a seal portion configured to come into contact with a panel including an attachment hole to which the grommet is attached and through which a wire harness is passed;
a tubular portion into which the wire harness is inserted, the tubular portion including a first tubular portion, a second tubular portion and a third tubular portion in contact with an outer circumferential surface of the first tubular portion; and
a plurality of coupling portions that are provided with a space therebetween in an axial direction of the grommet, and that include a first coupling portion coupling the main body and the first tubular portion, a second coupling portion coupling the main body and the second tubular portion, and a third coupling portion coupling the main body and the third tubular portion,
wherein at least one of the first, second and third coupling portions includes a flexible portion configured to bend so as to absorb an inclination of the wire harness with respect to the panel, and
the first and second coupling portions provide a first sound insulation space therebetween, and the first and third coupling portions provide a second sound insulation space therebetween.

2. The grommet according to claim 1,
wherein the flexible portion includes a first thin portion that has a thinner wall thickness than the main body.

3. The grommet according to claim 1,
wherein the flexible portion includes a bent portion that has a bent shape protruding in the axial direction.

4. The grommet according to claim 1,
wherein the flexible portion includes a bellows portion that has a tubular shape coaxial with the tubular portion.

5. The grommet according to claim 1,
wherein the flexible portion is provided so as to be entirely continuous in a circumferential direction thereof.

6. The grommet according to claim 1,
wherein the first tubular portion, the second tubular portion and the third tubular portion are separate parts, and
the first coupling portion, the second coupling portion, and the third coupling portion are separate parts.

7. The grommet according to claim 1,
wherein the main body includes a first base portion and a second base portion that are separate parts,
the first coupling portion couples the first base portion and the first tubular portion,
the second coupling portion couples the second base portion and the second tubular portion,
the third coupling portion couples the first base portion and the third tubular portion,
the first coupling portion, the first base portion and the first tubular portion are integrally formed, and
the second coupling portion, the second base portion and the second tubular portion are integrally formed.

8. A grommet comprising:
a main body that includes a seal portion configured to come into contact with a panel including an attachment hole to which the grommet is attached and through which a wire harness is passed;
a tubular portion into which the wire harness is inserted; and
a pair of coupling portions that are provided with a space therebetween in an axial direction of the grommet, and that each of the pair of coupling portions couple the main body and the tubular portion to each other,
wherein at least one of the pair of coupling portions includes a flexible portion configured to bend so as to absorb an inclination of the wire harness with respect to the panel,
the pair of coupling portions provide a sound insulation space therebetween,
the main body includes a first member that is coupled to the tubular portion by one of the pair of coupling portions, and a second member that is coupled to the tubular portion by an other of the pair of coupling portions,
the first member includes the seal portion, the second member includes a covering portion config-
ured to cover an insertion hole of a sound insulation
member provided on one side surface of the panel, and the flexible portion is provided at least in the other
coupling portion that couples the second member to the 5
tubular portion.

9. The grommet according to claim 8, wherein the flexible portion formed in the other coupling
portion that couples the second member to the tubular
portion includes a second thin portion that is thinner 10
than the covering portion.

* * * * *